A. H. NEULAND.
MOTOR CYCLE LIGHTING SYSTEM.
APPLICATION FILED JAN. 19, 1914.
1,151,530.   Patented Aug. 24, 1915.
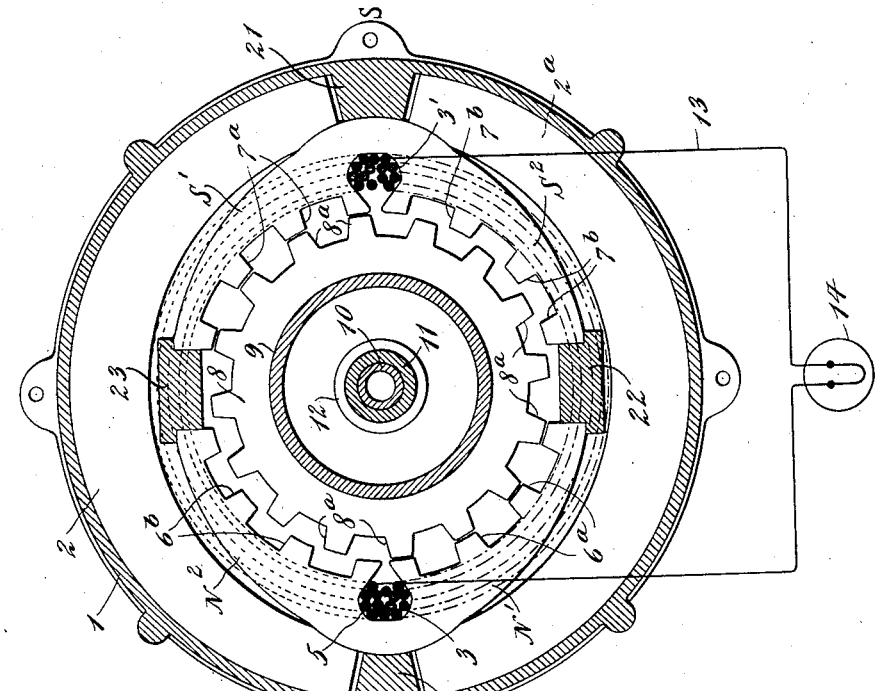
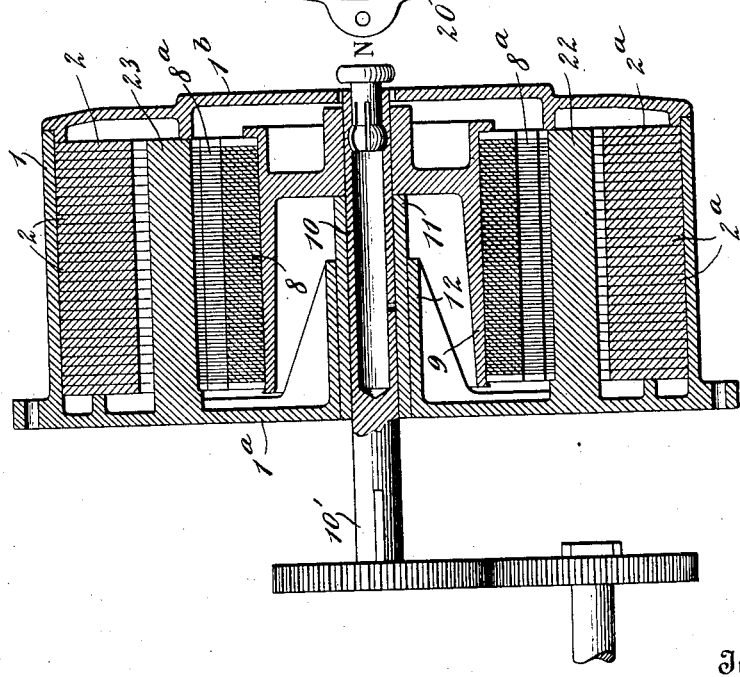
Witnesses:  
Inventor  
Alfons H. Neuland  
By his Attorneys  
Rosenbaum, Stockbridge & Borst

UNITED STATES PATENT OFFICE.

ALFONS H. NEULAND, OF BERGENFIELD, NEW JERSEY, ASSIGNOR TO NEULAND MAGNETO COMPANY, OF SAN FRANCISCO, CALIFORNIA, A CORPORATION OF CALIFORNIA.

MOTOR-CYCLE LIGHTING SYSTEM.

1,151,530.  Specification of Letters Patent.  Patented Aug. 24, 1915.

Application filed January 19, 1914. Serial No. 812,908.

*To all whom it may concern:*

Be it known that I, ALFONS H. NEULAND, a subject of the Czar of Russia, residing at Bergenfield, in the county of Bergen and State of New Jersey, have invented certain new and useful Improvements in Motor-Cycle Lighting Systems, of which the following is a full, clear, and exact description.

My invention relates to electric generating systems and particularly to electric lighting systems, and embodiments of my invention are particularly adapted as lighting systems for motor driven vehicles, such as motorcycles.

Lighting systems in common use for motorcycles are mainly of three types: those employing simply a storage battery from which the current is drawn for the lamps as desired; those employing a small generator which is connected directly to the lamps; and those employing a generator and storage battery. These systems, however, have well recognized disadvantages. For instance, the first type requires the charging of the storage battery at frequent intervals which is inconvenient and troublesome; the second type generates a varying current depending upon the speed of the motor which is weak at low speeds, and at high speeds, either generates an excessive current or entails the inclusion of clutch mechanism, which is undesirable; and the third type is complicated, heavy and expensive.

An object of my invention is to provide simple means for generating a constant current at the varying engine speeds for lighting motorcycles.

Another object is to provide a system for this purpose which will be inexpensive to construct and maintain, and which will be small, compact and easily attached to motorcycles.

Other objects and advantages of my invention will appear from the following description.

In my invention, I employ a generator of high frequency, as herein described, together with an external circuit of constant resistance, and a coil so proportioned with respect to turns and carrying capacity as to limit the generated current to that value required by the lamp in the external circuit, which value corresponds with the maximum current which the magneto is capable of generating. Due to the high frequency per revolution of the magneto generator, a sufficiently high voltage is attained at a relatively low speed of the magneto to force this full load current through the combined resistance of the circuit, and since this full load current is the maximum current which this magneto generator is capable of generating, the current is substantially unaffected by increase of speed of the magneto beyond this critical speed. The high frequency of this magneto generator also results in a constant unflickering light in the lamp at this low critical speed at which the full brilliancy of the lamp is attained.

In its specific form the magneto has on each side of the coil two poles of opposite polarity, preferably obtained by splitting or dividing the poles of a bipolar magnet; and the inner faces of the poles and the periphery of the rotative inductor are provided with corresponding teeth extending parallel to the axis of the inductor, the teeth on one pole of each polarity being circumferentially off-set a half tooth pitch from the teeth of the other pole of the same polarity, whereby the rotary inductor serves to alternately magnetically connect the poles of opposite polarity on opposite sides of the coil, and to reverse the magnetic field through the coil once for each angular movement of the inductor for a distance of one tooth pitch. An alternating high frequency current suitable for lighting purposes is thereby obtained at a relatively low speed of rotation of the inductor.

My invention also includes various other features and arrangements of parts which will hereinafter more fully appear.

I shall now describe the embodiment of my invention illustrated in the accompanying drawings and shall thereafter point out my invention in claims.

Figure 1 is a central axial section of the magneto generator; Fig. 2 is a transverse section of the same on line 2—2 of Fig. 1, looking toward the left, and including a diagram of the external lighting circuit.

The illustrated magneto consists of a suitable cylindrical frame or casing 1 of non-magnetic material such as brass, closed on one face by an integral wall 1ª, and a removable wall 1ᵇ being provided for the other face. The cylindrical wall is provided on diametrically opposed sides with longitudinal ribs 20 and 21, and integral with the wall 1ᵃ and spaced somewhat from the inner periphery of the cylindrical wall are two outstanding lugs or arms 22 and 23 parallel with the axis of the casing. The permanent magnet is composed of two substantially semi-circular parts 2 and 2ᵃ fitting within the casing and spaced by the ribs 20 and 21, each part being composed of a plurality of semi-circular plates. These magnet sections 2 and 2ᵃ are arranged with their north poles and south poles adjacent, forming a permanent north and south pole, as indicated by the letters N and S. These poles are provided with laminated pole pieces of general arcuate shape which are separate members and are supported at three points, their two ends abutting against the lugs or arms 22 and 23, and their centers contacting against the respective ribs 21 and 22 and adjacent ends of the magnet sections. In the form shown, the arms or lugs 22 and 23 are of general T-shape in cross section and have their heads extending oppositely over the adjacent ends of the pole pieces. The laminated magnets and pole pieces are thus rigidly supported and locked in the frame and securely held in place against lateral or circumferential displacement. This construction for supporting and holding the magnets and pole parts or divisions is the subject of a divisional application, Serial No. 18,009, filed March 30, 1915. The pole pieces are provided with central coil-receiving slots 3 and 3′ respectively, and the halves or sections form pole parts or divisions S′, S², N′, and N², respectively, the pole-parts S′ and N² being on one side of the coil 5, and the pole parts N′ and S² being on the opposite side of the coil. The induction coil 5 is arranged within the slots 3 and 3′, and extends between the poles longitudinally of the casing and surrounding the inductor.

The inner faces of the pole parts are arranged in a circle and are provided with similar teeth 6ᵃ, 6ᵇ, 7ᵃ and 7ᵇ, respectively, arranged parallel to each other and to the axis of the casing. The teeth on each section are of the same pitch and the two adjacent teeth on the opposite sides of each of the slots 3 and 3′ are so spaced apart that the teeth on one pole parts are off-set from the teeth on the other pole parts of the same polarity a distance equal to one-half a tooth pitch.

Mounted axially in the casing and rotatable between the pole-pieces is an inductor 8 formed of a plurality of annular laminated plates, preferably of steel, mounted upon a drum 9 which has a hub portion fixed on the shaft 10 of the inductor, which is driven by the engine shaft 10′ in any usual or suitable way, as by gearing, as shown. The shaft 10 bears in the sleeve 11 which is secured within an inwardly-projecting hub 12 integral with the front of the casing.

The inductor is provided with teeth 8ᵃ similar and parallel to those on the pole-pieces, and of a similar pitch, the diameter of the inductor being such that the ends of its teeth rotate in close proximity to the inner ends of the teeth on the pole parts. Due to the off-setting of the teeth on one pole part of each polarity a distance equal to one-half a tooth pitch, relative to those on the other pole-piece of the same polarity, it is evident that, as the inductor rotates, its teeth alternately are alined with those on pole parts of opposite polarity on opposite sides of the coil, that is, in one position its teeth are alined with teeth 6ᵃ and 7ᵃ on the pole parts N′ and S′ respectively, and an angular movement of the inductor for one-half a tooth pitch causes its teeth to aline with the teeth 6ᵇ and 7ᵇ on the pole parts N² and S² respectively, and that its teeth are staggered in these respective positions with the teeth with which they are not alined. Since the magnetic flux will assume the path of least reluctance, it is evident that the flux is therefore reversed through the coil for each angular movement of the inductor for a distance of one tooth pitch and that for each complete rotation of the inductor, twice as many impulses are produced in the coil as there are teeth on the inductor.

The ends of the induced coil 5 are connected to the external lighting circuit 13 within which is arranged the glow lamp 14. The lamp is chosen in connection with each lighting unit which will require for its full brilliancy a current corresponding approximately to the maximum possible current in the coil of the magneto generator, and the resistance of which will produce in the entire circuit the resistance which will require the voltage produced at the critical magneto speed to force the full load current through the circuit. Since a constant resistance is essential to the invention, only a lamp satisfying these requirements can be used. It will now be seen that a current of sufficiently high frequency to produce a steady and unflickering light is induced in the circuit at relatively low speeds of rotation of the inductor, and an induced coil of the proper number of turns and of proper carrying capacity is chosen which, with the lamp of given resistance, will have generated therein, under the conditions depending upon the shape, pitch and number of teeth on the inductor and on the pole-pieces, only the maximum current required by the lamp. Thus there is obtained a lighting system, the various factors of which are dependent one on the other and are in proper correspondence with each other. Due to the rapid reversals of the magnetic field, the required voltage necessary to force the maximum current through the external and internal resistances and to give to the lamp its full brilliancy is reached at a very low rate of angular velocity.

From the foregoing it will be manifest that with the inductor at rest and some of the teeth alined and others staggered, no current being generated in the coil, all of the magnetic flux is passing through the coil. As the inductor starts to rotate, a slight voltage is generated, and a current in proportion to the generated voltage is forced through the circuit and this current reacts upon the flux and results in a decrease of the effective alternating flux through the coil and in an increase of the opposed flux through the coil between the non-alined teeth. In other words, at any instant when the teeth in one half of the pole are alined with the teeth in the inductor, thus making an easy path for the flux, there is a certain amount of flux passing between the teeth of the same pole on the other side of the coil and the staggered teeth of the inductor, which acts to oppose the generation of current in the coil. This opposing flux is sufficiently great at the time the maximum current is generated in the coil to prevent the further generation of current therein, should the speed increase. A further increase in speed will result in an increased voltage and a correspondingly increased current and a correspondingly decreased effective flux through the coil as a result of the back ampere turns until a condition is reached where sufficient voltage is generated to force full load current through the circuit producing full brilliancy in the lamp and which is also the maximum current which the machine is capable of generating. An increase in speed above this critical speed will have substantially no effect upon the brilliancy of the lamp since the current can not rise above this maximum value. When the critical speed has been reached, that is, the speed which develops sufficient potential to force the predetermined current through the circuit which is practically non-inductive, the power factor of the current is substantially unity; at the instant of maximum current the teeth on both sides of the coil are half alined. An increase of speed above this critical value causes the predetermined current to increasingly react due to the lagging of the current behind the voltage. When a speed many times the critical is reached the power factor may decrease substantially to zero; the reaction is now greatest being directly in line with the field at the unalined teeth and directly opposed to the field at the alined teeth.

It will now be apparent that in practical operation, the lamp on the motorcycle will reach its full brilliancy practically the instant that the motor is started, and that thereafter the current passing through the lamp is substantially unaffected by the speed of the motor and all danger of burning out the lamp is thereby obviated. As the running of the motor is a requisite to the movement of the motorcycle, the lamp is always illuminated when it is needed.

It is obvious that various modifications may be made in the construction shown in the drawings and above particularly described within the principle and scope of my invention.

I claim:—

1. A motor vehicle lighting system comprising a magneto adapted to be driven at variable speeds and including an induced coil, and a consuming circuit of constant resistance connected to said coil including current consuming lighting means, the magneto being adapted to produce a high frequency and potential at a low critical speed serving to force a predetermined current through said circuit, the coil being so disposed relative to the field as to produce said predetermined current at said critical speed and so that the current therein will react against one portion of the field and coöperate with another portion of the field, whereby the current is maintained substantially constant at speeds greater than said critical speed.

2. A motor vehicle lighting system comprising a magnetic field member having few poles, a relatively rotatable inductor closely associated with the field member, the field member and the inductor being so shaped as to coöperate in producing a high frequency relative to the number of poles at a relatively low speed of rotation, and an electric circuit of predetermined fixed resistance including current consuming lighting means and including an induced and reactance coil, said coil being associated with the magnetic field member and so disposed in the field that a predetermined current will be generated in the circuit at a relatively low critical speed of rotation and so that at increased speeds the current therein will increasingly react against one portion of the field and increasingly coöperate with another portion of the field, whereby the current is maintained substantially constant at speeds greater than said relatively low speed.

3. A motor vehicle lighting system comprising a magneto having relatively few field poles and adapted to be driven at variable speeds and including an induced coil, and a consuming circuit of fixed constant resistance connected to said coil and including current consuming lighting means, the magneto being adapted to produce with said few poles a high frequency and potential at a relatively low critical speed, the said frequency and potential being such that at a relatively low critical speed a predetermined current is generated in said circuit, said current in said coil reacting against the active flux and coöperating with the opposed flux, at speeds in excess of the said critical speed, whereby the predetermined current value is maintained substantially constant.

4. A motor vehicle lighting system comprising a magneto having relatively few field poles and adapted to be driven at variable speeds and including an induced coil, and a consuming circuit of fixed constant resistance connected to said coil and including current consuming lighting means, the magneto being adapted to produce with said few poles a high frequency and potential at a relatively low critical speed, the coil being so disposed in the field as to divide the flux into a predominating portion which is active in generating a potential and a lesser portion which is opposed to the generation of a potential, and said coil being so proportioned that at a low predetermined critical speed a predetermined current is caused to flow in said circuit by the said frequency and potential, whereby at speeds in excess of the said critical speed the current in said coil reacts against the active flux and coöperates with the opposed flux and maintains its predetermined value substantially constant.

5. A motor vehicle lighting system comprising a magnetic field member having few poles, a relatively rotatable inductor closely associated with the field member, the field member and the inductor being so shaped as to coöperate to produce a high frequency at a relatively low critical speed of rotation, and an electric circuit of predetermined fixed resistance including current consuming lighting means and including an induced and reactance coil, the coil being so disposed in the field as to divide the flux into a predominating portion which is active in generating a potential and a lesser portion which is opposed to the generation of a potential, and said coil being so proportioned that at a low predetermined critical speed a predetermined current is caused to flow in said circuit by the said frequency and potential, whereby at speeds in excess of the said critical speed the current in said coil reacts against the active flux and coöperates with the opposed flux and maintains its predetermined value substantially constant.

6. A motor vehicle lighting system adapted for use with variable speed motors and comprising a magnet having two poles, each pole comprising two spaced pole parts or divisions, a rotary inductor adapted to be driven in proportion to the speed of the motor and disposed between the poles of the magnet, and an electric circuit of predetermined fixed resistance including a glow lamp and including an induced and reactance coil, the said coil surrounding two adjacent divisions of opposite polarity, the coöperative faces of the inductor and polar divisions being so mutilated as to generate a relatively high frequency and potential and produce a predetermined current in the circuit at a relatively low critical speed of rotation, the said coil being so proportioned that at the said critical speed of rotation the predetermined current is caused to flow in said circuit by said frequency and potential, whereby at speeds in excess of the said critical speed the current in said coil reacts against the active flux and coöperates with the opposed flux and maintains its predetermined value substantially constant.

In witness whereof I subscribe my signature in the presence of two witnesses.

ALFONS H. NEULAND.

Witnesses:
   VICTOR D. BORST,
   WALDO M. CHAPIN.